(12) United States Patent
Jilg (10) Patent No.: US 12,556,136 B2
(45) Date of Patent: Feb. 17, 2026

(54) METHOD AND CIRCUIT ARRANGEMENT FOR ACQUIRING A CHARACTERISTIC CURVE OF A PV GENERATOR

(71) Applicant: SMA Solar Technology AG, Niestetal (DE)

(72) Inventor: Martin Jilg, Hessisch Lichtenau (DE)

(73) Assignee: SMA Solar Technology AG, Niestetal (DE)

( * ) Notice: Subject to any disclaimer, the term of this patent is extended or adjusted under 35 U.S.C. 154(b) by 152 days.

(21) Appl. No.: 18/407,589

(22) Filed: Jan. 9, 2024

(65) Prior Publication Data

US 2024/0146241 A1 May 2, 2024

Related U.S. Application Data

(63) Continuation of application No. PCT/EP2023/054032, filed on Feb. 17, 2023.

(30) Foreign Application Priority Data

Mar. 22, 2022 (DE) ............ 10 2022 106 717.3

(51) Int. Cl.
*H02J 3/38* (2006.01)
*H02J 3/46* (2006.01)
(Continued)

(52) U.S. Cl.
CPC ............ *H02S 50/10* (2014.12); *H02J 3/381* (2013.01); *H02J 3/46* (2013.01); *H02M 1/32* (2013.01); *H02S 40/32* (2014.12); *H02J 2300/24* (2020.01)

(58) Field of Classification Search
None
See application file for complete search history.

(56) References Cited

U.S. PATENT DOCUMENTS 10,056,758 B2    8/2018   Unru et al.
11,031,906 B2    6/2021   Ni et al.
(Continued)

FOREIGN PATENT DOCUMENTS

CN    106712716 A    5/2017
CN    107017836 A    8/2017
(Continued)

OTHER PUBLICATIONS

English translation of WO-2020254029-A1 (Year: 2020).*
International Search Report dated May 9, 2023, for International Application No. PCT/EP2023/054032.

*Primary Examiner* — Jermele M Hollington
(74) *Attorney, Agent, or Firm* — Eschweiler & Potashnik, LLC (57) ABSTRACT

A method for acquiring a characteristic curve of a PV generator is disclosed. In a power generation installation, an output side of each PV generator is connected via an assigned DC-DC converter, in parallel to a DC link as the input element of a DC-AC converter. The method includes reducing a cumulative output power of those DC-DC converters for which the associated PV generators are not intended for acquiring the characteristic curve during the acquisition of the characteristic curve of the PV generator to be scanned to ensure that the sum of the reduced cumulative output power and of the expected maximum power of the PV generator to be scanned does not exceed a nominal power of the DC-AC converter, and subsequently acquiring the characteristic curve of the PV generator to be scanned.

18 Claims, 4 Drawing Sheets

(51) Int. Cl.
*H02M 1/32* (2007.01)
*H02S 40/32* (2014.01)
*H02S 50/10* (2014.01)

(56) References Cited

U.S. PATENT DOCUMENTS

| | | |
|---|---|---|
| 11,171,489 B2 | 11/2021 | Yu et al. |
| 11,888,439 B2 * | 1/2024 | Viotto ............... H02S 40/36 |
| 2010/0156185 A1 * | 6/2010 | Kim ................ H02J 3/46 |
| | | 307/82 |
| 2018/0234051 A1 * | 8/2018 | Ni ................ H02S 40/38 |
| 2020/0220357 A1 | 7/2020 | Fujiwara |
| 2021/0036520 A1 * | 2/2021 | Yu ................ H02J 3/381 |
| 2022/0109401 A1 | 4/2022 | Viotto et al. |

FOREIGN PATENT DOCUMENTS

| | | | |
|---|---|---|---|
| CN | 107196604 A | 9/2017 | |
| CN | 2020254029 A1 | 12/2020 | |
| DE | 102019116548 A1 | 12/2020 | |
| EP | 3764504 A1 | 1/2021 | |
| WO | 2014118059 A1 | 8/2014 | |
| WO | WO-2020254029 A1 * | 12/2020 | ............. H02S 40/36 |

* cited by examiner

Fig. 3

METHOD AND CIRCUIT ARRANGEMENT FOR ACQUIRING A CHARACTERISTIC CURVE OF A PV GENERATOR

REFERENCE TO RELATED APPLICATIONS

This application is a Continuation of International Application number PCT/EP2023/054032, filed on Feb. 17, 2023, which claims the benefit of German Application number 10 2022 106 717.3, filed on Mar. 22, 2022. The contents of the above-referenced Patent applications are hereby incorporated by reference in their entirety.

FIELD

The application relates to a method and a circuit arrangement for acquiring a characteristic curve of a photovoltaic generator, PV generator for short, and to a power generation installation having such a circuit arrangement. Acquiring a characteristic curve of a PV generator can also be referred to as a characteristic-curve scan of the PV generator or as scanning the PV generator.

BACKGROUND

In a power generation installation, a PV generator can be connected to a power converter via a DC-DC converter (DC voltage converter), wherein a PV generator can comprise a plurality of PV strings which can be connected in series and/or in parallel. A PV string can in turn comprise a plurality of PV modules. The power converter can, for example, be a DC-AC converter (inverter) connected to an AC grid, for example, an AC supply grid, in order to exchange electrical power with the AC grid and, for example, to feed electrical power into the AC grid.

A PV generator has a voltage-current characteristic curve, UI characteristic curve for short, which illustrates the dependency of the DC current generated by the PV generator on the PV voltage present at the PV generator. It may be desired to acquire the UI characteristic curve of the PV generator during operation. For example, in derated power generation installations, it is known from documents WO2014/118059 A1 and US 2020/0220357 A1, when individual DC-DC converters of the power generation installation parse UI characteristic curves, to compensate for the resulting fluctuation in the total power by controlling one or more other DC-DC converters of the power generation installation in a compensating manner and to thus keep the total power as constant as possible. This compensating control operation puts increased regulation-related and communication demands on the power generation installation.

U.S. Pat. No. 11,171,489 B2 also describes, e.g., a method for acquiring UI characteristic curves for PV generators of a power generation installation, in which method a converter not involved in the acquisition of the UI characteristic curve compensates for the power variation in the converter acquiring the UI characteristic curve. In extreme cases, it is furthermore disclosed to reduce the power of the converters not involved in the acquisition to zero while the characteristic curve is being acquired. The application is based on the object of presenting an improved method for acquiring a characteristic curve of a PV generator. Moreover, the intention is to present a circuit arrangement for acquiring a characteristic curve of a PV generator.

SUMMARY

In one embodiment a power generation installation having a plurality of PV generators, each PV generator is connected to a DC-AC converter via an assigned DC-DC converter. The output sides of these DC-DC converters are connected to a DC link as the input element of the DC-AC converter. A PV generator comprises at least one PV string, for example, a plurality of PV strings. A plurality of PV strings of a PV generator can be connected in parallel or connected in series or be connected in a combination of series and parallel circuits. Correspondingly, the input side of the DC-DC converter can be connected to a PV string or be connected to a plurality of PV strings which can be connected to the DC-DC converter in parallel, in series or in a combination thereof.

In one embodiment the PV generators can be connected, via their respective assigned DC-DC converter, in a parallel circuit to the DC link as the input element of the DC-AC converter. Alternatively, the PV generators can be connected, via their respective assigned DC-DC converter, in series to the DC link as the input element of the DC-AC converter.

In one embodiment a characteristic curve of one of the PV generators can be acquired by carrying out a so-called scan, which can also be referred to as scanning of the PV generator. During scanning of the PV generator, e.g. different voltage values at the output of the PV generator are adjusted by the assigned DC-DC converter and the current supplied by the PV generator is measured for the adjusted voltage value. Alternatively, it is also possible to adjust the current flowing through the PV generator and measure the resulting voltage. The UI characteristic curve of the PV generator can be acquired by plotting the measured current values against the adjusted voltage values.

In one embodiment a method for acquiring a characteristic curve of a PV generator to be scanned from a plurality of PV generators in such a power generation installation comprises:

a) reducing a cumulative output power of those DC-DC converters for which the associated PV generators are not intended for acquiring the characteristic curve, as a function of a maximum power that, during the acquisition of the characteristic curve of the PV generator to be scanned, is to be expected on the output side of the DC-DC converter connected to the PV generator to be scanned, in order to ensure that the sum of the reduced cumulative output power and of the expected maximum power of the PV generator to be scanned does not exceed a nominal power of the DC-AC converter, and b) subsequently acquiring the characteristic curve of the PV generator to be scanned.

In one embodiment, in a power generation installation having DC-DC converters connected in parallel at the input of the DC-AC converter, the method further comprises:

c) during the acquisition of the characteristic curve: keeping a voltage of the DC link constant using the DC-AC converter. In this case, the voltage of the DC link corresponds to the voltage on the output side of the DC-DC converters. In this case, the value of the voltage of the DC link in this act corresponds to a value greater than or equal to the open-circuit voltage of the PV generator to be scanned, this being guaranteed when the DC-DC converters used are step-up converters. This voltage is, for example, kept constant by controlling clocked semiconductor switches of the DC-AC converter.

In one embodiment, in a power generation installation in which the DC-DC converters are connected in series to the DC link at the input of the DC-AC converter, the method comprises: c1) during the acquisition of the characteristic curve: keeping a current which flows through the series circuit of the DC-DC converters constant using the DC-AC converter. This current is, for example, kept constant by controlling clocked semiconductor switches of the DC-AC converter.

The method according to the invention is characterized in that it is simple to realize and carrying out the scan causes a negligible loss in power that is able to be generated. At the same time, overloading of the DC-AC converter is avoided, this overloading constituting a danger especially in installations in which the possible nominal power of the installed PV generators is significantly greater than the nominal power of the DC-AC converter; with the result that these installations are operated at the nominal power of the DC-AC converter constantly and thus also immediately before the method according to the disclosure is carried out.

During the scanning of one of the PV generators, the output power of the PV generator to be scanned varies since different points on the UI characteristic curve are passed through and these different points each exhibit a different output power of the PV generator to be scanned. Here, the varying output power of the PV generator to be scanned has a maximum power which lies at the maximum power point (MPP) on the UI characteristic curve of the PV generator to be scanned. Overall, the sum of the output power of the PV generator to be scanned and of the cumulative output power of the rest of the PV generators should not exceed the nominal power of the DC-AC converter in order to avoid damage to the DC-AC converter and to support grid compatibility with the AC grid.

The expected maximum power of the PV generator involved in the scan can be determined by the method before reducing the cumulative output power. In this case, the expected maximum power can be based on empirical values, e.g. from previous scans or otherwise known maximum powers of the PV generators not involved in the scan, and moreover can be dependent on, or ascertained from, the temperature, sunlight and similar environmental factors.

The method described above is able to achieve this since the cumulative output power of the PV generators not involved in the scan is lowered during the scan to the extent that the sum of the output powers of all the PV generators does not exceed the nominal power of the DC-AC converter during the scan. At the same time, this makes it possible, even during a characteristic-curve scan in one of the PV generators, to continue to produce as much electrical power as possible and output this via the DC-AC converter. This is advantageous in one embodiment since it is hereby possible to continue to keep the generation of electrical power at an acceptable level. Sufficient distance from the nominal power of the DC-AC converter is maintained such that the characteristic curve of the PV generator to be scanned can be passed through completely. It may even be that the output power of the individual DC-DC converters not involved in the scan and of the associated PV generators does not need to be significantly reduced, if at all.

The advantage of the method in one embodiment is that it is easy to implement since the cumulative output power of the DC-DC converters not involved in the scan does not need to be changed during the scan but rather can remain at a constant level and electrical active power can nevertheless be generated at an acceptable level and supplied to the AC grid.

According to one embodiment of the disclosure, during the acquisition of the characteristic curve, the individual output powers of those DC-DC converters for which the associated PV generators are not intended for acquiring the characteristic curve are kept constant. In this case, the individual output powers can be lowered with respect to the output power at the respective maximum power point of the associated PV generators in order to lower the cumulative output power of the DC-DC converters not involved in the scan. However, these PV generators continue to produce electrical power, albeit at a reduced level. In this case, keeping the individual output powers constant has the advantage that it simplifies the method and the regulation-related outlay can be reduced.

In one embodiment of the method, the characteristic curve of the PV generator to be scanned is acquired during open-loop operation of the DC-DC converter assigned to the PV generator to be scanned. In this case, the open-loop operation has the advantage over closed-loop operation that a control loop with feedback can be dispensed with and the method becomes simpler and quicker. Compared to closed-loop operation in which, e.g., a voltage value is adjusted in a targeted manner, which involves the voltage value present at the PV generator being fed back, open-loop operation merely adjusts something without feedback. E.g., at least one parameter of the DC-DC converter can be adjusted and the DC-DC converter can be controlled in this way. For the scan, this adjustment or this parameter is then successively changed in order to acquire the characteristic curve by virtue of the fact that, e.g. by changing the parameter, the voltage present at the PV generator is changed and measured and the current output by the PV generator at the present voltage is measured. This parameter can, for example, be the duty cycle with which the DC-DC converter is controlled. In one embodiment, the parameter or the duty cycle is varied over a predefined period of time, as a result of which the reproducibility of the scan is improved and subsequent correction calculations are simplified.

In one embodiment of the method, the open-loop operation involves current limiting so as to avoid the permissible input current of the DC-DC converter assigned to the PV generator to be scanned being exceeded. The current limiting serves to protect the DC-DC converter and can be implemented, e.g., as a protective circuit or as a superimposed regulation operation acting in a limiting manner. Only when the permissible input current of the DC-DC converter is exceeded does the protective circuit become activated or does the superimposed regulation operation intervene in a limiting manner. Other than that the current limiting has no influence on the scanning process. In response to the activation, in one embodiment the scan can be interrupted and then, e.g., continued with changed control in order to avoid reactivation of the protective circuit or of the superimposed regulation operation.

In one embodiment of the method, the controlled parameter is the duty cycle of the DC-DC converter. In open-loop operation, the duty cycle of the DC-DC converter assigned to the PV generator to be scanned is therefore controlled and successively changed. In this case, the scan for acquiring the characteristic curve can be performed, for example, using a predefined curve of the duty cycle.

In one embodiment, after acquiring the characteristic curve of the PV generator to be scanned, the method comprises: d) ending the reduction of the cumulative output power of those DC-DC converters for which the associated PV generators are not intended for acquiring the characteristic curve.

This makes it possible for the reduction of the output powers in one embodiment to only take place during a scan and for power to be output again at a non-reduced level after the scan has ended.

A circuit arrangement for acquiring a characteristic curve of a PV generator to be scanned from a plurality of PV generators in a power generation installation is intended and configured to regulate those DC-DC converters for which the associated PV generators are not intended for acquiring the characteristic curve, as a function of a maximum power that, during the acquisition of the characteristic curve of the PV generator to be scanned, is to be expected on the output side of the DC-DC converter connected to the PV generator to be scanned, such that their cumulative output power is reduced, in order to ensure that the sum of the cumulative output power and of the expected maximum power of the PV generator to be scanned does not exceed a nominal power of the DC-AC converter, and to acquire the characteristic curve of the PV generator to be scanned.

In one embodiment of the power generation installation in which the output side of each of the PV generators is connected, in each case via an assigned DC-DC converter, in parallel to the DC link as the input element of the DC-AC converter, the circuit arrangement is intended and configured to keep a voltage of the DC link and the individual output powers of those DC-DC converters for which the associated PV generators are not intended for acquiring the characteristic curve constant during the acquisition of the characteristic curve.

In another embodiment of the power generation installation in which the output sides of the PV generators are connected, in each case via an assigned DC-DC converter, in series to the DC link as the input element of the DC-AC converter, the circuit arrangement is intended and configured to keep a current through the series circuit of the DC-DC converters and the individual output powers of those DC-DC converters for which the associated PV generators are not intended for acquiring the characteristic curve constant during the acquisition of the characteristic curve.

The circuit arrangement can be used to ascertain the expected maximum power of the DC-DC converter involved in the scan, before reducing the cumulative output power. In this case, the expected maximum power can be based on empirical values, e.g. from previous scans, and moreover can be dependent on the temperature, sunlight and similar environmental factors. The required reduction can also be determined in a conservative way from the nominal variables of the DC-DC converter to be scanned, for example, from the nominal current or the nominal power.

In one embodiment, the circuit arrangement is arranged in the DC-AC converter and/or in the DC-DC converters and, for example, is designed and configured to additionally realize closed-loop and/or open-loop control tasks of the DC-AC converter and/or of the DC-DC converters. For example, the circuit arrangement can be in the form of at least one computing circuit which is arranged in the DC-AC converter and/or in the DC-DC converters. The at least one computing circuit can then be optionally configured and designed to additionally perform closed-loop and/or open-loop control tasks of the DC-AC converter and/or of the DC-DC converters.

In one embodiment a power generation installation having a DC-AC converter and having a plurality of PV generators can comprise an above-described circuit arrangement, wherein the output sides of the PV generators are connected, in each case via an assigned DC-DC converter, in parallel or in series to a DC link as the input element of the DC-AC converter. A PV generator can be scanned in accordance with one of the above-described methods. After a PV generator has been scanned, another PV generator from the plurality of PV generators can be scanned in accordance with the described method. It is possible to use the described method to scan some or all of the plurality of PV generators of the power generation installation one after the other.

BRIEF DESCRIPTION OF THE FIGURES

The application will be explained and described in more detail below on the basis of example embodiments illustrated in the figures.

FIG. 1 schematically shows a method for acquiring a characteristic curve of a PV generator, FIG. 2 schematically shows curves of characteristic electrical variables in a power generation installation, FIG. 3 schematically shows an example of a power generation installation comprising DC-DC converters that are connected in parallel, and FIG. 4 schematically shows an example of a power generation installation comprising DC-DC converters that are connected in series.

DETAILED DESCRIPTION

Figure 1:
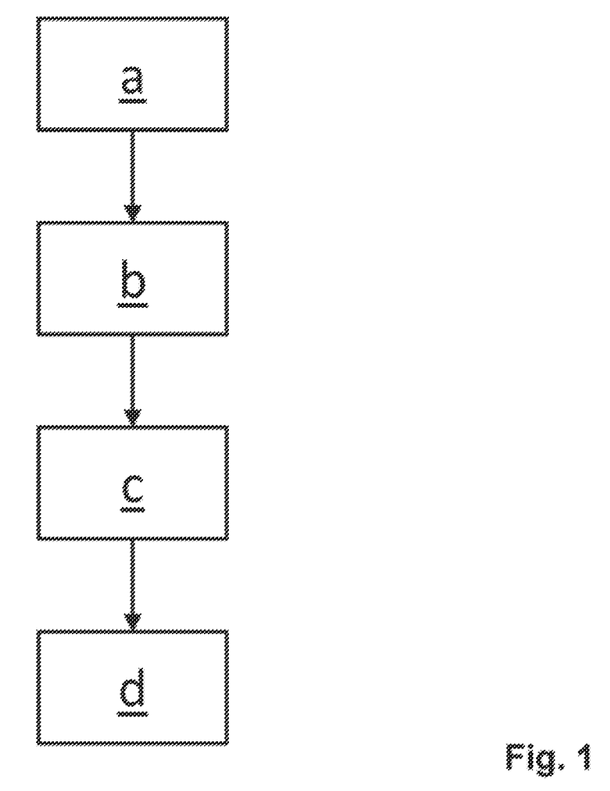
Figure 3:
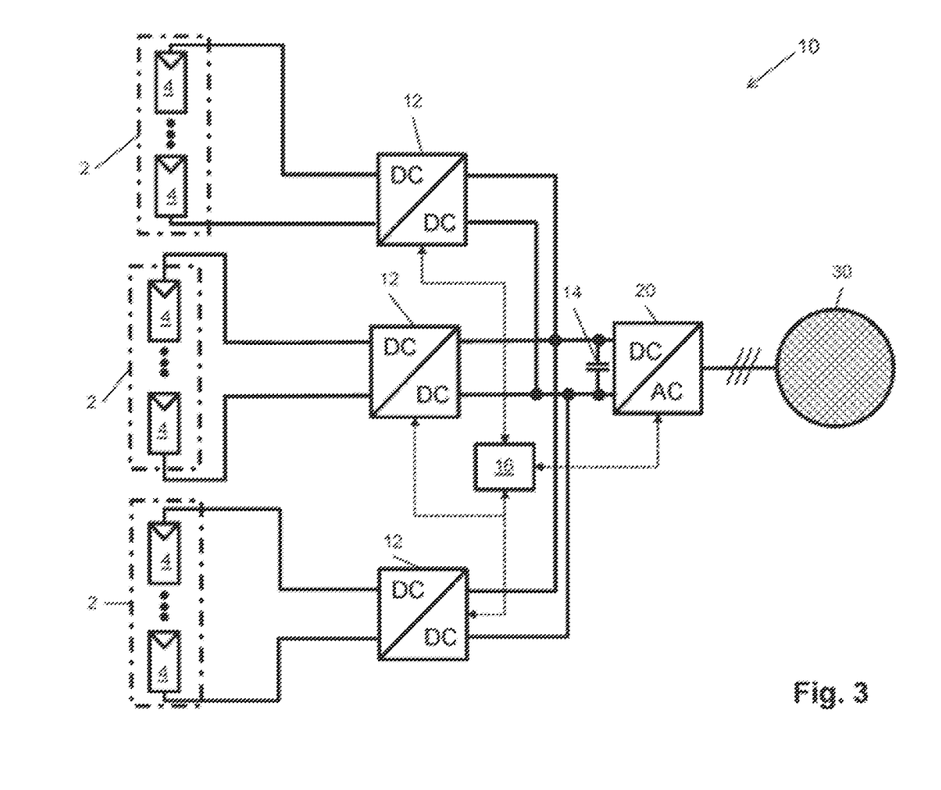
Figure 4:
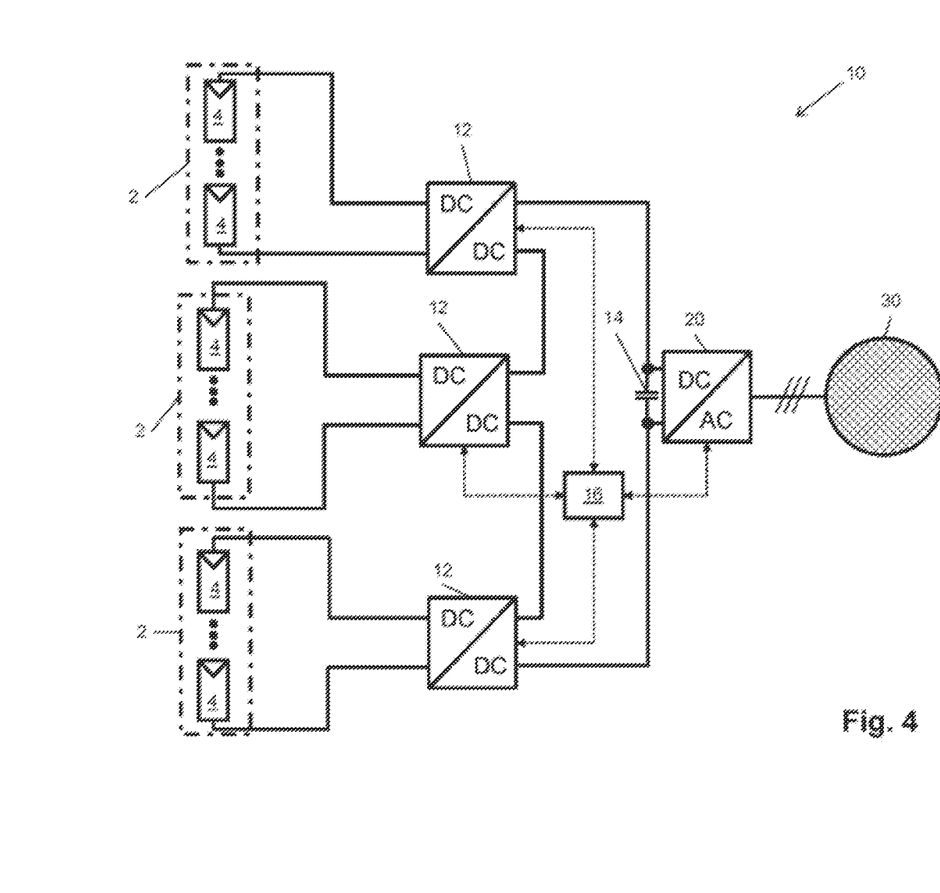

FIG. 1 schematically shows a method for acquiring a characteristic curve of a PV generator 2 to be scanned from a plurality of PV generators 2 in a power generation installation 10, such as that illustrated in FIG. 3 or 4. The method comprises:

a) reducing a cumulative output power KA of those DC-DC converters 12 for which the associated PV generators 2 are not intended for acquiring the characteristic curve. The reduction takes place as a function of a maximum power Pscan that, during the acquisition of the characteristic curve of the PV generator 2 to be scanned, is to be expected on the output side of the DC-DC converter 12 connected to the PV generator 2 to be scanned. The reduction is selected such that the sum of the cumulative output power KA and of the expected maximum power Pscan does not exceed a nominal power PN of the DC-AC converter 20, and b) subsequently acquiring the characteristic curve of the PV generator 2 to be scanned.

If the power generation installation 10 is embodied as illustrated in FIG. 3, where the output side of each of the PV generators 2 is connected, in each case via an assigned DC-DC converter 12, in parallel to a DC link 14 as the input element of a DC-AC converter 20, then in one embodiment c) during the acquisition of the characteristic curve, a voltage UZK of the DC link 14 is kept constant using the DC-AC converter 20.

In an alternative embodiment, if the power generation installation 10 is embodied as illustrated in FIG. 4, where the output sides of the PV generators 2 are connected, in each case via an assigned DC-DC converter 12, in series to a DC link 14 as the input element of a DC-AC converter 20, then c1) during the acquisition of the characteristic curve, a current of the series circuit of the DC-DC converters 12 is kept constant using the DC-AC converter 20.

In this case, a circuit arrangement 16, which can optionally be in the form of a regulating circuit of the DC-AC converter 20, can be used to keep the voltage of c) or the current of c1) constant.

After acquiring the characteristic curve of the PV generator to be scanned, d) the reduction of the cumulative output power KA of those DC-DC converters 12 for which the associated PV generators 2 are not intended for acquiring the characteristic curve is ended.

This makes it possible, after a scan, to return once again to a power output as before the scanning process.

Figure 2:
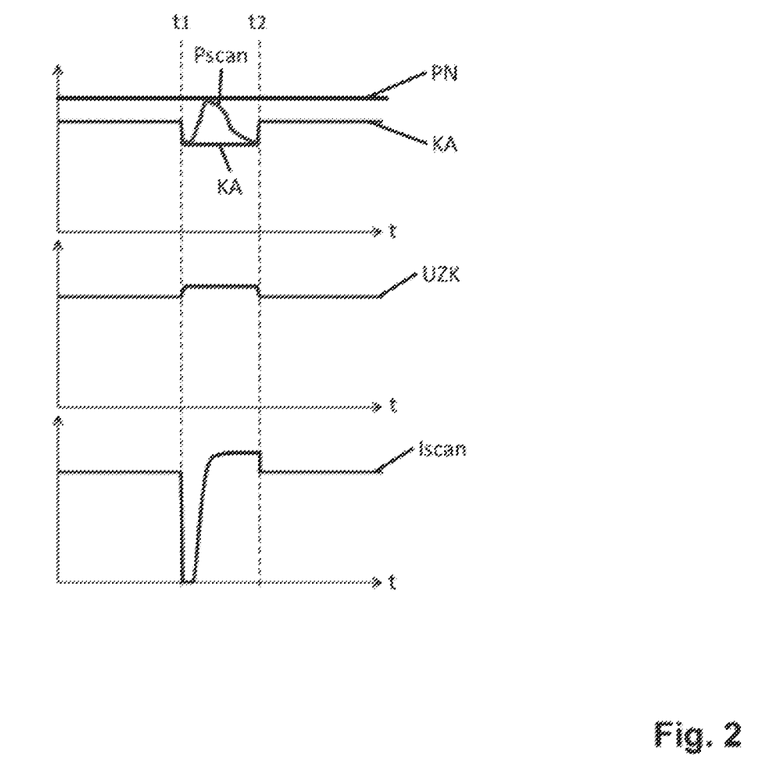

FIG. 2 illustrates, by way of example, electrical variables in the power generation installation 10 before, during and after a scanning process. The process of scanning a PV generator starts at time t1 and ends at time t2.

In the uppermost part of the graph of FIG. 2, the nominal power PN of the DC-AC converter 20 is plotted. Below that, the cumulative output power KA of those DC-DC converters 12 that are not involved in the scanning process because their associated PV generators are not intended for scanning is illustrated. During the scanning process, that is to say between t1 and t2, this cumulative output power KA is lowered and kept constant at the lowered value.

The DC-DC converter involved in the scan is, in one embodiment, operated in an open-loop manner, i.e. its duty cycle is changed such that, at the connected PV generator to be scanned, the voltage is changed such that a characteristic curve can be acquired. For example, the duty cycle can be changed in a ramped manner in one embodiment. The current Iscan output by the PV generator during the scanning is illustrated in the bottom part of FIG. 2. The power Pscan output during the scan by the DC-DC converter involved in the scan is plotted against the cumulative output power KA in the top part of FIG. 2. It can be seen that the reduction of the cumulative output power KA has been selected such that the sum of the maximum power of the output power Pscan of the PV generator 2 involved in the scan and of the cumulative output power during the scanning process remains below the nominal power PN of the DC-AC converter 20.

For one embodiment of the power generation installation 10, as illustrated in FIG. 3, the DC-link voltage UZK is kept constant during the scanning process. This is illustrated in the middle of FIG. 2. In this case, the DC-link voltage UZK corresponds to the open-circuit voltage of the PV generator 2 to be scanned.

For one embodiment of the power generation installation 10, as illustrated in FIG. 4, the current flowing through the DC-DC converters connected in series is kept constant during the scanning process.

FIG. 3 shows one embodiment of the power generation installation 10 having a DC-AC converter 20, and having a plurality of PV generators 2 which each comprise a plurality of PV modules 4 connected in series. The output sides of the PV generators 2 are connected, via a respectively assigned DC-DC converter 12, in parallel to a DC link 14 as the input element of the DC-AC converter 20. The power generation installation 10 feeds electrical power into an AC grid 30 via the DC-AC converter 20. The power generation installation 10 comprises a circuit arrangement 16 which is designed and configured to perform the above-described method.

In one embodiment, the circuit arrangement 16 is designed and configured to regulate those DC-DC converters 12 for which the associated PV generators 2 are not intended for acquiring the characteristic curve, as a function of a maximum power Pscan that, during the acquisition of the characteristic curve of the PV generator 2 to be scanned, is to be expected on the output side of the DC-DC converter 12 connected to the PV generator 2 to be scanned. Consequently, their cumulative output power KA is reduced, in order to ensure that the sum of the cumulative output power KA and of the expected maximum power Pscan does not exceed a nominal power PN of the DC-AC converter 20. Moreover, the circuit arrangement 16 is designed and configured to acquire the characteristic curve of the PV generator 2 to be scanned by virtue of the DC-DC converter assigned to the PV generator 2 to be scanned being controlled in such a way that the duty cycle is kept the same across several clock periods. As a result, the voltage at the PV generator 2 to be scanned is given and the associated measurement value, the current output by the PV generator 2 to be scanned, can be ascertained in a targeted manner. The duty cycle can then be changed, kept across several clock periods, and the next measurement value of the characteristic curve can be ascertained. This process can be repeated until the entire characteristic curve, from the open-circuit point to the short-circuit point, has been passed through.

In the power generation installation 10 of FIG. 3, the circuit arrangement 16 is moreover intended and configured to keep the voltage of the DC link constant during the acquisition of the characteristic curve.

FIG. 4 shows one embodiment of the power generation installation 10 having the DC-AC converter 20, and having a plurality of PV generators 2 which each comprise a plurality of PV modules 4 connected in series. The output sides of the PV generators 2 are connected, via the respectively assigned DC-DC converter, in series to the DC link 14 as the input element of the DC-AC converter 20. The power generation installation 10 feeds electrical power into the AC grid 30 via the DC-AC converter 20. The power generation installation 10 comprises the circuit arrangement 16 which is designed and configured to perform the above-described method. For example, the circuit arrangement 16 is designed and configured to regulate those DC-DC converters 12 for which the associated PV generators 2 are not intended for acquiring the characteristic curve, as a function of a maximum power Pscan that, during the acquisition of the characteristic curve of the PV generator 2 to be scanned, is to be expected on the output side of the DC-DC converter 12 connected to the PV generator 2 to be scanned, such that their cumulative output power KA is reduced, in order to ensure that the sum of the cumulative output power KA and of the expected maximum power Pscan does not exceed a nominal power PN of the DC-AC converter 20. Moreover, the circuit arrangement 16 is designed and configured to acquire the characteristic curve of the PV generator 2 to be scanned. This characteristic curve is acquired in the same way as described above in relation to FIG. 3.

In the power generation installation 10 from FIG. 4, the circuit arrangement 16 is moreover intended and configured to keep a current through the series circuit of the DC-DC converters constant during the acquisition of the characteristic curve.

It is possible for the circuit arrangement 16, as illustrated in FIG. 3 and in FIG. 4, to be in the form of a separate unit or circuit, e.g. a computing circuit, and to exchange information with the DC-AC converter 20 and the DC-DC converters, e.g. via communication lines. It is likewise possible for the circuit arrangement 16 to be arranged in the DC-AC converter 20 and/or in the DC-DC converters 12. For example, it can be designed and configured to additionally realize closed-loop and/or open-loop control tasks of the DC-AC converter 20 and/or of the DC-DC converters 12. For example, the circuit arrangement 16 can be in the form of at least one computing circuit which is arranged in the DC-AC converter 20 and/or in the DC-DC converters 12. The at least one computing circuit can, e.g., be in the form of the regulating circuit of the DC-AC converter 20 or be part of the same. For example, the circuit arrangement 16 can be configured and designed to additionally perform closed-loop and/or open-loop control tasks of the DC-AC converter 20 and/or of the DC-DC converters 12.

The plurality of PV generators 2 of the power generation installation 10 can be scanned one PV generator at a time one after the other. In this case, it is possible to use the described method to scan some or all of the plurality of PV generators of the power generation installation 10 one after the other.

What is claimed is:

1. A method for acquiring a characteristic curve of a PV generator to be scanned from a plurality of PV generators in a power generation installation, wherein an output side of each of the PV generators is connected, in each case via an assigned DC-DC converter, in parallel to a DC link as an input element of a DC-AC converter, the method comprising:
   a) reducing a cumulative output power of those DC-DC converters for which the assigned PV generators are not intended for acquiring the characteristic curve, as a function of a maximum power that, during an acquisition of the characteristic curve of the PV generator to be scanned, is to be expected on an output side of the DC-DC converter connected to the PV generator to be scanned, in order to ensure that a sum of the reduced cumulative output power and of the expected maximum power of the PV generator to be scanned does not exceed a nominal power of the DC-AC converter,
   b) subsequently acquiring the characteristic curve of the PV generator to be scanned,
   c) wherein, during the acquiring of the characteristic curve, maintaining constant a voltage of the DC link using the DC-AC converter, and
   d) wherein, during the acquiring of the characteristic curve, individual output powers of those DC-DC converters for which the associated PV generators are not intended for acquiring the characteristic curve are kept constant.

2. The method as claimed in claim 1, wherein the characteristic curve of the PV generator to be scanned is acquired during open-loop operation of the DC-DC converter assigned to the PV generator to be scanned.

3. The method as claimed in claim 2, wherein the open-loop operation involves current limiting so as to avoid a permissible input current of the DC-DC converter assigned to the PV generator to be scanned being exceeded.

4. The method as claimed in claim 2, wherein the open-loop operation involves setting a duty cycle of the DC-DC converter assigned to the PV generator to be scanned, wherein the scan for acquiring the characteristic curve is performed in particular using a curve of the duty cycle.

5. The method as claimed in claim 1, wherein, after acquiring the characteristic curve of the PV generator to be scanned, the method comprises:
   e) ending a reduction of the cumulative output power of those DC-DC converters for which the associated PV generators are not intended for acquiring the characteristic curve.

6. A method for acquiring a characteristic curve of a PV generator to be scanned from a plurality of PV generators in a power generation installation, wherein output sides of the PV generators are connected, in each case via an assigned DC-DC converter, in series to a DC link as an input element of a DC-AC converter, the method comprising:
   a) reducing a cumulative output power of those DC-DC converters for which the assigned PV generators are not intended for acquiring the characteristic curve, as a function of a maximum power that, during an acquisition of the characteristic curve of the PV generator to be scanned, is to be expected on an output side of the DC-DC converter connected to the PV generator to be scanned, in order to ensure that a sum of the cumulative output power and of the expected maximum power of the PV generator to be scanned does not exceed a nominal power of the DC-AC converter,
   b) subsequently acquiring the characteristic curve of the PV generator to be scanned,
   c1) wherein, during the acquiring of the characteristic curve, maintaining constant a current of a series circuit of the DC-DC converters using the DC-AC converter, and
   d) wherein, during the acquiring of the characteristic curve, individual output powers of those DC-DC converters for which the associated PV generators are not intended for acquiring the characteristic curve are kept constant.

7. The method as claimed in claim 6, wherein the characteristic curve of the PV generator to be scanned is acquired during open-loop operation of the DC-DC converter assigned to the PV generator to be scanned.

8. The method as claimed in claim 7, wherein the open-loop operation involves current limiting so as to avoid a permissible input current of the DC-DC converter assigned to the PV generator to be scanned being exceeded.

9. The method as claimed in claim 7, wherein the open-loop operation involves setting a duty cycle of the DC-DC converter assigned to the PV generator to be scanned, wherein the scan for acquiring the characteristic curve is performed in particular using a curve of the duty cycle.

10. The method as claimed in claim 6, wherein, after acquiring the characteristic curve of the PV generator to be scanned, the method comprises:
    e) ending the reduction of the cumulative output power of those DC-DC converters for which the associated PV generators are not intended for acquiring the characteristic curve.

11. A circuit arrangement for acquiring a characteristic curve of a PV generator to be scanned from a plurality of PV generators in a power generation installation, wherein an output side of each of the PV generators is connected, in each case via an assigned DC-DC converter, in parallel to a DC link as an input element of a DC-AC converter, wherein the circuit arrangement is configured to:
    regulate those DC-DC converters for which the assigned PV generators are not intended for acquiring the characteristic curve, as a function of a maximum power that, during an acquisition of the characteristic curve of the PV generator to be scanned, is to be expected on the output side of the DC-DC converter connected to the PV generator to be scanned, such that their cumulative output power is reduced, in order to ensure that a sum of the reduced cumulative output power and of the expected maximum power does not exceed a nominal power of the DC-AC converter,
    acquire the characteristic curve of the PV generator to be scanned, and
    keep a voltage of the DC link and individual output powers of those DC-DC converters for which the associated PV generators are not intended for acquiring a characteristic curve constant during the acquisition of the characteristic curve.

12. The circuit arrangement as claimed in claim 11, wherein the circuit arrangement is arranged in the DC-AC converter and/or in the DC-DC converters.

13. The circuit arrangement as claimed in claim 11, wherein the circuit arrangement is configured to control the DC-AC converter and/or the DC-DC converters in an open-loop manner and/or a closed-loop manner.

14. A power generation installation having a DC-AC converter and having a plurality of PV generators, wherein output sides of the PV generators are connected, in each case via an assigned DC-DC converter, in parallel or in series to a DC link as the input element of the DC-AC converter, and wherein the power generation installation comprises a circuit arrangement as claimed in claim 11.

15. A circuit arrangement for acquiring a characteristic curve of a PV generator to be scanned from a plurality of PV generators in a power generation installation, wherein output sides of the PV generators are connected, in each case via an assigned DC-DC converter, in series to a DC link as an input element of a DC-AC converter, wherein the circuit arrangement is configured to:

regulate those DC-DC converters for which the associated PV generators are not intended for acquiring the characteristic curve, as a function of a maximum power that, during the acquisition of a characteristic curve of the PV generator to be scanned, is to be expected on an output side of the DC-DC converter connected to the PV generator to be scanned, such that their cumulative output power is reduced, in order to ensure that a sum of the reduced cumulative output power and of the expected maximum power does not exceed a nominal power of the DC-AC converter, acquire the characteristic curve of the PV generator to be scanned, and keep a current through the series circuit of the DC-DC converters and individual output powers of those DC-DC converters for which the associated PV generators are not intended for acquiring the characteristic curve constant during the acquisition of the characteristic curve.

16. The circuit arrangement as claimed in claim 15, wherein the circuit arrangement is arranged in the DC-AC converter and/or in the DC-DC converters.

17. The circuit arrangement as claimed in claim 15, wherein the circuit arrangement is intended and configured to control the DC-AC converter and/or the DC-DC converters in an open-loop and/or closed-loop manner.

18. A power generation installation having a DC-AC converter and having a plurality of PV generators, wherein the output sides of the PV generators are connected, in each case via an assigned DC-DC converter, in parallel or in series to a DC link as the input element of the DC-AC converter, and wherein the power generation installation comprises a circuit arrangement as claimed in claim 15.

* * * * *